(12) United States Patent
Kolter et al.

(10) Patent No.: US 11,301,771 B2
(45) Date of Patent: Apr. 12, 2022

(54) SYSTEMS AND METHODS FOR DETERMINING DISAGGREGATED ENERGY CONSUMPTION BASED ON LIMITED ENERGY BILLING DATA

(71) Applicant: C3.ai, Inc., Redwood City, CA (US)

(72) Inventors: Zico Kolter, Pittsburgh, PA (US); Nikhil Krishnan, Los Altos, CA (US); Mehdi Maasoumy, Redwood City, CA (US); Henrik Ohlsson, San Francisco, CA (US)

(73) Assignee: C3.AI, INC., Redwood City, CA (US)

( * ) Notice: Subject to any disclaimer, the term of this patent is extended or adjusted under 35 U.S.C. 154(b) by 961 days.

(21) Appl. No.: 14/549,955

(22) Filed: Nov. 21, 2014

(65) Prior Publication Data

US 2016/0148113 A1 May 26, 2016

(51) Int. Cl.
*G06N 20/00* (2019.01)
*G06N 7/00* (2006.01)

(52) U.S. Cl.
CPC ............. *G06N 20/00* (2019.01); *G06N 7/005* (2013.01)

(58) Field of Classification Search
CPC ...................................................... G06N 20/00
USPC .......................................................... 706/12
See application file for complete search history.

(56) References Cited

U.S. PATENT DOCUMENTS

| | | | | |
|---|---|---|---|---|
| 8,156,062 B2* | 4/2012 | Cho | ........................ | G06F 15/16 706/45 |
| 8,560,134 B1* | 10/2013 | Lee | ................... | H02J 13/00026 700/291 |
| 9,775,520 B2* | 10/2017 | Tran | ......................... | A61B 7/04 |
| 2007/0276270 A1* | 11/2007 | Tran | ..................... | A61B 5/0022 600/508 |
| 2008/0001735 A1* | 1/2008 | Tran | ..................... | G06F 19/3418 340/539.22 |
| 2008/0004904 A1* | 1/2008 | Tran | ..................... | A61B 5/0006 705/2 |

(Continued)

FOREIGN PATENT DOCUMENTS

WO    WO-2016081882 A1    5/2016

OTHER PUBLICATIONS

Estiri, et al., "Different Regions, Differences in Energy Consumption: Do regions account for the variability in household energy consumption?" Working Paper No. 134, Center for Statistics and the Social Sciences, University of Washington, Jun. 14, 2013.*

(Continued)

*Primary Examiner* — Hien D Khuu
(74) *Attorney, Agent, or Firm* — Wilson Sonsini Goodrich & Rosati

(57) ABSTRACT

Various embodiments of the present disclosure can include systems, methods, and non-transitory computer readable media configured to train a Bayesian network model based on a given set of data. Information associated with a user can be received. The information can include aggregated energy consumption data at one or more low frequency time intervals. At least a portion of the information can be inputted into the Bayesian network model. A plurality of energy consumption values for a plurality of energy consumption sources associated with the user can be inferred based on inputting the at least the portion of the information into the Bayesian network model.

19 Claims, 12 Drawing Sheets

(56) References Cited

U.S. PATENT DOCUMENTS

| | | | | |
|---|---|---|---|---|
| 2008/0120650 | A1* | 5/2008 | Orihara | H04N 5/44543 725/45 |
| 2008/0222680 | A1* | 9/2008 | Murakami | H04N 5/44543 725/46 |
| 2009/0045804 | A1* | 2/2009 | Durling | G01R 21/133 324/140 R |
| 2009/0083203 | A1* | 3/2009 | Cho | G06F 15/16 706/21 |
| 2010/0057416 | A1* | 3/2010 | Peterman | G06F 17/5004 703/6 |
| 2010/0274602 | A1* | 10/2010 | Kaufman | G06Q 10/04 705/7.38 |
| 2010/0275147 | A1* | 10/2010 | Kaufman | G06Q 10/04 715/771 |
| 2010/0280667 | A1* | 11/2010 | Steinberg | G05D 23/1902 700/276 |
| 2011/0046904 | A1* | 2/2011 | Souilmi | G01D 4/004 702/62 |
| 2011/0153246 | A1* | 6/2011 | Donaldson | G01R 21/1331 702/65 |
| 2011/0307200 | A1* | 12/2011 | Hsu | G06Q 50/06 702/61 |
| 2012/0033243 | A1* | 2/2012 | Nakazato | G03G 15/0131 358/1.13 |
| 2013/0024029 | A1* | 1/2013 | Tran | A61B 5/7267 700/278 |
| 2013/0184838 | A1* | 7/2013 | Tchoryk, Jr. | G05B 13/042 700/31 |
| 2013/0289788 | A1* | 10/2013 | Gupta | G05B 13/02 700/291 |
| 2014/0001012 | A1* | 1/2014 | Meyer | G07F 11/42 198/707 |
| 2014/0058572 | A1* | 2/2014 | Stein et al. | |
| 2014/0129160 | A1* | 5/2014 | Tran | H02J 3/14 702/61 |
| 2014/0278165 | A1* | 9/2014 | Wenzel | G06Q 10/0639 702/61 |
| 2014/0336960 | A1* | 11/2014 | Haghighat-Kashani | G01R 21/133 702/60 |
| 2015/0068069 | A1* | 3/2015 | Tran | H04B 1/385 36/136 |
| 2016/0004805 | A1* | 1/2016 | Drees | G06Q 50/08 703/2 |
| 2016/0092986 | A1* | 3/2016 | Lian | G06Q 30/08 700/295 |
| 2016/0148113 | A1* | 5/2016 | Kolter | G06N 99/005 706/12 |
| 2016/0314400 | A1* | 10/2016 | Charpentier | G06Q 10/04 |
| 2018/0348711 | A1* | 12/2018 | Gupta | G05B 15/02 |

OTHER PUBLICATIONS

Hartl, et al., "infer: A Bayesian Inference Approach towards Energy Efficient Data Collection in Dense Sensor Networks," in Proceedings of the 25th IEEE International Conference on Distributed Computing Systems (ICSCS'05), 2005.*

Noh, et al., "Data-driven forecasting algorithms for building energy consumption," in Proc. SPIE 8692, Sensors and Smart Structures Technologies for Civil, Mechanical, and Aerospace Systems 2013, 86920T (Apr. 19, 2013).*

Rahman, et al., "A Bayesian Model to Enhance Domestic Energy Consumption Forecast," in Proceedings of the 2012 International Conference on Industrial Engineering and Operations Management, Istanbul, Turkey, Jul. 3-6, 2012.*

Azadeha, et al., "A meta-heuristic framework for forecasting household electricity consumption," Applied Soft Computing, 11(1), 614-620, 2011.*

Swan et al. "Modeling of end-use energy consumption in the residential sector: A review of modeling techniques", ScienceDirect, 2009, p. 1819-1835. (Year: 2009).*

PCT/US2015/061953 International Search Report and Written Opinion dated Feb. 4, 2016.

* cited by examiner

SYSTEMS AND METHODS FOR DETERMINING DISAGGREGATED ENERGY CONSUMPTION BASED ON LIMITED ENERGY BILLING DATA

FIELD OF THE INVENTION

The present technology relates to the field of energy management. More particularly, the present technology provides techniques for determining disaggregated energy consumption based (at least in part) on limited energy billing data.

BACKGROUND

Resource consumption touches every aspect of life. Resources are consumed for a wide variety of purposes every day. In some cases, energy is consumed in order to provide power to various components or to enable various devices or systems to function. In one example, energy in the form of electricity is consumed to enable the operations of computing devices or computing systems, appliances, air-conditioners, and many other components, entities, devices, or systems. In another example, energy in the form of gas is consumed to enable gas space heaters, gas water heaters, gas stoves, and other components, entities, devices, or systems to function.

Due to significant amounts of energy being consumed every day, can be beneficial to provide tools or services for observing, tracking, and managing energy consumption. Under conventional approaches, energy management tools may require data to be provided at a high rate or frequency, which can necessitate a large amount of data to be gathered. Moreover, conventional approaches to providing energy management tools may require the installation of special sensors, meters, hardware, or other equipment. Accordingly, these conventional approaches are often times inconvenient, impractical, or inefficient. Such concerns can create challenges for and reduce the overall efficacy associated with known energy management techniques.

SUMMARY

Various embodiments of the present disclosure can include systems, methods, and non-transitory computer readable media that are configured to train a Bayesian network model based on a given set of data. Information associated with a user can be received. The information can include aggregated energy consumption data at one or more low frequency time intervals. At least a portion of the information can be inputted into the Bayesian network model. A plurality of energy consumption values for a plurality of energy consumption sources associated with the user can be inferred based on inputting the at least the portion of the information into the Bayesian network model.

In an embodiment, the information associated with the user can include one or more inputs from the user.

In an embodiment, the one or more inputs from the user can include at least one of a housing type input, a square-footage input, a rent-or-own input, an occupant amount input, a fridge amount input, an air-conditioning input, or a heating input. In some cases, the rent-or-own input can include a rent input and/or an own input, either of which can indicate whether the user rents or owns a particular property.

In an embodiment, the one or more inputs from the user can be in response to one or more questions provided to the user.

In an embodiment, the training of the Bayesian network model can include at least one of a structure learning process and a parameter learning process.

In an embodiment, the structure learning process can facilitate developing a structure of the Bayesian network model. In some instances, the structure learning process can utilize at least one of machine learning or manual effort to develop the structure of the Bayesian network model.

In an embodiment, the parameter learning process can enable the training of the Bayesian network model. In some cases, the parameter learning process can utilize at least a subset of the given set of data to determine probabilities associated with the Bayesian network model.

In an embodiment, the one or more low frequency time intervals can include at least one of a daily interval, a weekly interval, a monthly interval, or a yearly interval.

In an embodiment, the aggregated energy consumption data can be provided via billing information associated with the user.

In an embodiment, the inferring of the plurality of energy consumption values can be performed without installing additional equipment for the user.

In an embodiment, the inferring of the plurality of energy consumption values can include applying a maximum a posteriori estimation process to the Bayesian network model to acquire the plurality of energy consumption values for the plurality of energy consumption sources associated with the user.

In an embodiment, the given set of data can be represented in the Bayesian network model. In some instances, at least a first subset of the given set of data can influence, in the Bayesian network model, at least a second subset of the given set of data.

In an embodiment, the given set of data can include at least one of an acquired set of energy consumption data associated with a plurality of other users or an acquired set of external properties.

In an embodiment, the acquired set of energy consumption data associated with the plurality of other users can include at least one of a housing type metric, a square-footage metric, a rent-or-own metric, an occupant amount metric, a fridge amount metric, an air-conditioning metric, or a heating metric.

In an embodiment, the acquired set of external properties can include at least one of a heating degree day (HDD) metric, a cooling degree day (CDD) metric, a year-made metric, a building type metric, a locational metric, or a climate metric.

In an embodiment, the given set of data can change over time causing the Bayesian network model to be updated over time.

In an embodiment, the information associated with the user can change over time causing the Bayesian network model to be updated over time.

In an embodiment, at least a portion of the plurality of energy consumption sources can be associated with at least one of an electric appliance or a gas appliance. In some cases, the electric appliance can include any device or system that consumes energy in the form of electricity. In some cases, the gas appliance can include any device or system that consumes energy in the form of gas.

Many other features and embodiments of the disclosed technology will be apparent from the accompanying drawings and from the following detailed description.

Figure 1:
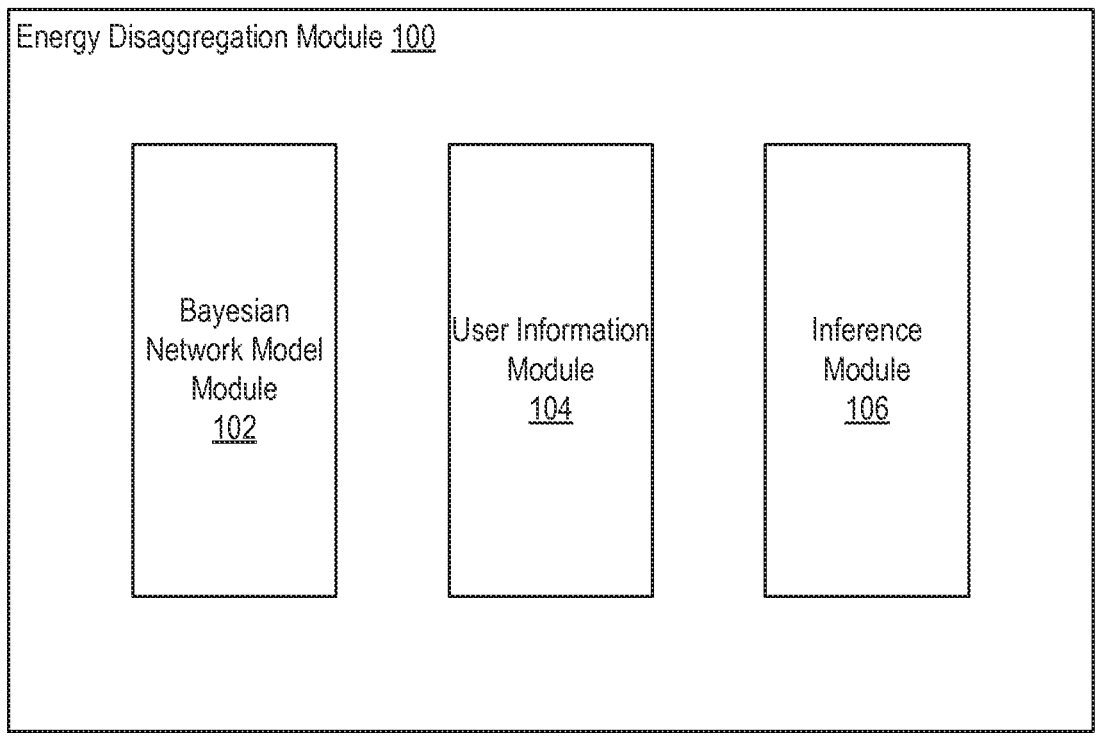
FIG. 1 illustrates an example energy disaggregation module configured to facilitate determining disaggregated energy consumption based on limited data, in accordance with an embodiment of the present disclosure.

The figures depict various embodiments of the present disclosure for purposes of illustration only, wherein the figures use like reference numerals to identify like elements. One skilled in the art will readily recognize from the following discussion that alternative embodiments of the structures and methods illustrated in the figures may be employed without departing from the principles of the disclosed technology described herein.

DETAILED DESCRIPTION

Determining Disaggregated Energy Consumption Based on Limited Energy Billing Data Resources, such as energy, are consumed or used every day for a wide variety of purposes. In one example, consumers can use energy in the form of gas to power various appliances at home and businesses can use gas to operate various machinery. In another example, consumers and businesses can use energy in the form of electricity to power various electronic appliances and other electrical components, devices, or systems.

Energy consumption is facilitated by energy providers who supply energy to meet demand. Energy providers, such as utility companies, can provide one or more forms of energy, such as gas and electricity. Energy providers can utilize energy distribution systems to provide or deliver energy to their intended customers or users. In exchange, energy providers can bill their customers or users for the amount of energy consumed. Customers or users have to pay their energy bills if they wish to continue using the provided energy.

In some cases, the customers or users may desire to reduce their energy bills or costs, such as by reducing their energy consumption. As such, energy management tools (or services) can be provided to the customers or users. In some instances, energy management tools can provide energy disaggregation. In general, energy disaggregation can correspond to a breakdown illustrating how various energy consumption sources or components consume energy. In one example, energy disaggregation can indicate that a user's air-conditioning is consuming X amount of electricity, that the user's dishwasher is consuming Y amount of electricity, and that the user's gas stove is consuming Z amount of gas. Accordingly, the user can utilize energy disaggregation provided by the energy management tools to monitor and observe how he or she (or how his or her household, business, etc.) consumes energy. With the capability to monitor and observe how energy is being consumed, the user can modify his or her habits, routines, or other practices accordingly to reduce energy consumption and his or her energy costs.

However, under conventional approaches, providing energy disaggregation can be inconvenient, impractical, and inefficient. Conventional approaches to providing energy disaggregation can require frequent uploading, gathering, or acquiring of energy consumption data from customers or users. Conventional approaches to providing energy disaggregation can require large amounts of energy consumption data from customers or users. Moreover, conventional approaches can require special or proprietary sensors, hardware, and other equipment to be installed for the customers or users, which can be time-consuming, labor intensive (e.g., installation, repair, maintenance, etc.), and expensive. Accordingly, an improved approach for providing or determining energy disaggregation can be advantageous.

Various embodiments of the present disclosure can provide or determine disaggregated energy consumption based (at least in part) on limited data, such as limited energy buffing data, Systems, methods, and non-transitory computer readable media of the disclosed technology can be configured to train a Bayesian network model based on a given set of data. Information associated with a user can be received. The information can include aggregated energy consumption data at one or more low frequency time intervals. At least a portion of the information can be inputted into the Bayesian network model. A plurality of energy consumption values for a plurality of energy consumption sources associated with the user can be inferred based on inputting the portion of the information into the Bayesian network model. It is further contemplated that many variations are possible.

FIG. 1 illustrates an example energy disaggregation module 100 configured to facilitate determining disaggregated energy consumption based on limited data, in accordance with an embodiment of the present disclosure. As shown in the example of FIG. 1, the energy disaggregation module 100 can include a Bayesian network model module 102, a user information module 104, and an inference module 106.

In some embodiments, the example energy disaggregation module 100 can be implemented, in part or in whole, using software, hardware, or any combination thereof. In general, a module can be associated with software, hardware, or any combination thereof. In some implementations, one or more functions, tasks, and/or operations of modules can be carried out or performed by software routines, software processes, hardware components, and/or any combination thereof. In some cases, the energy disaggregation module 100 can be implemented as software running on one or more computing devices or systems. In one example, the energy disaggregation module 100 can be implemented within an application (e.g., app) on a computing device or system, such as a smartphone, tablet, laptop, or desktop computer of a user. In some embodiments, the energy disaggregation module 100 can be implemented by or with an energy management platform. The energy platform may provide the functionality of the energy disaggregation module 100 as a service or through software. The energy disaggregation module 100 can be implemented within a proprietary program used by an energy provider, such as a utility company. In some instances, the energy disaggregation module 100 can be implemented with a network resource, such as a website or webpage. It is contemplated that many variations are possible.

The Bayesian network model module 102 can be configured to facilitate generating, developing, and/or training a Bayesian network model, which can be utilized in determining disaggregated energy consumption based (at least in part) on limited data, such as limited energy billing data. In general, the Bayesian network model can store various types of information for various features, including information about how some features influence other features. Examples of features stored or represented by the Bayesian network model can include, but are not limited to, external features and user features. External features can include features that are known, knowable, and/or acquirable, such as features relating to weather conditions, climate, a year in which a property is built, etc. User features can include features that are associated with a user, such as home features or properties for a home user and business features or properties for a business user. In some cases, the user can provide some of the user features. More details regarding the Bayesian network model and the Bayesian network model module 102 will be provided below with reference to FIG. 2.

The user information module 104 can be configured to facilitate receiving information associated with a user. The information can include aggregated energy consumption data at one or more low frequency time intervals. In some instances, the aggregated energy consumption data at low frequency time intervals can correspond to daily, monthly, or yearly, etc., total energy consumption data. Examples of the aggregated energy consumption data can include, but are not limited to, monthly electricity bills and usage, monthly gas bills and usage, etc. Moreover, in some embodiments, the information associated with the user can include profile information about the user, such as information about a home if the user is a home user, information about a business if the user is a business user, and/or information about the user. As such, the information associated with the user can include information about user features provided or inputted by the user or another source having appropriate permissions to provide information about the user. The information associated with the user and the user information module 104 will be discussed in more detail below with reference to FIG. 3.

Moreover, the energy disaggregation module 100 can be configured to input at least a portion of the information associated with the user into the Bayesian network model. For example, the Bayesian network model module 102, the user information module 104, and/or the inference module 106 within the energy disaggregation module 100 can facilitate inputting at least the portion of the information into the Bayesian network model. In some cases, the information associated with the user can change over time, which can cause the Bayesian network model to be updated over time.

The inference module 106 can be configured to infer a plurality of energy consumption values for a plurality of energy consumption sources or components associated with the user. The inferring of the plurality of energy consumption values can be based on the inputting of at least the portion of the information into the Bayesian network model. Various embodiments of the present disclosure can enable the inferring of the plurality of energy consumption values to yield satisfactory results (e.g., satisfactory estimates of disaggregated energy consumption values) even when limited data is provided, such as energy billing data provided at one or more low frequency time intervals. Moreover, various embodiments can enable the inferring of the plurality of energy consumption values to be performed without installing additional equipment for the user. More details regarding the inference module 106 will be provided below with reference to FIG. 4.

Figure 2:
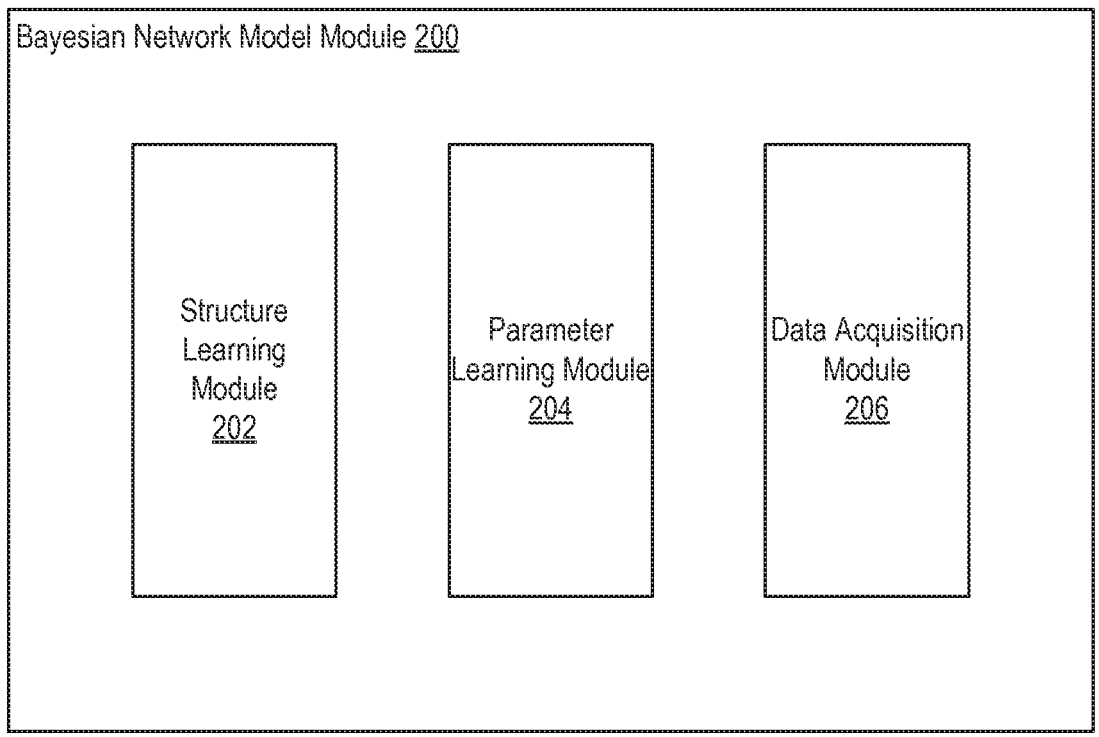
FIG. 2 illustrates an example Bayesian network model module configured to facilitate determining disaggregated energy consumption based on limited data, in accordance with an embodiment of the present disclosure.

FIG. 2 illustrates an example Bayesian network model module 200 configured to facilitate determining disaggregated energy consumption based on limited data, in accordance with an embodiment of the present disclosure. In some embodiments, the Bayesian network model module 102 of FIG. 1 can be implemented as the example Bayesian network model module 200. As shown in the example of FIG. 2, the Bayesian network model module 200 can include a structure learning module 202, a parameter learning module 204, and a data acquisition module 206.

As discussed above, the Bayesian network model module 200 can be configured to facilitate generating, developing, and/or training a Bayesian network model, which can be utilized in determining disaggregated energy consumption based on limited data. In general, a Bayesian network model (also referred to as a Bayesian network, a Bayesian model, etc.) corresponds to a probabilistic graphical model that represents a set of variables or features and their conditional dependencies. The Bayesian network model can utilize a directed acyclic graph (DAG) to represent the variables or features. Each variable or feature can be represented by a node in the Bayesian network model. In one example, there can be a connection, link, or edge, etc., between a first node and a second node if one node is influenced by or dependent upon the other. If the first node is influenced by or dependent upon the second node, then the connection can be directed from the second node to the first node. If the second node is influenced by or dependent upon the first node, then the connection can be directed from the first node to the second node.

In some instances, the Bayesian network model can represent probabilistic relationships among external conditions, household/business properties, energy consumption sources, disaggregated energy consumption, and aggregated energy consumption. In one example, when limited data about external conditions, household/business properties, energy consumption sources, etc., is provided, the Bayesian network model can be used to determine, infer, or estimate the most likely disaggregated energy consumption values for energy consumption sources based on available aggregated energy consumption data. For example, based on limited aggregated energy consumption data, the Bayesian network model can be used to determine, infer, or approximate the most likely values of disaggregated energy consumption for various energy consumption sources or components. More details relating to Bayesian network models are provided below with reference to FIG. 5A and FIG. 5B.

In some instances, in order to utilize the Bayesian network model, the Bayesian network model must first be developed or trained. In some cases, the developing or training of the Bayesian network model can include at least one of a structure learning process and a parameter learning process.

The structure learning module 202 can be configured to enable the generating, developing, and/or training the Bayesian network model to be utilized in determining disaggregated energy consumption based on limited data. In some embodiments, the structure learning module 202 can perform the structure learning process to learn, predict, determine, or develop a structure of the Bayesian network model. The structure learning process can facilitate determining, developing, or specifying which nodes (e.g., features, variables) within the Bayesian network model are influenced by or dependent upon which other nodes. The structure learning process can facilitate determining, developing, or specifying which nodes are connected and the directions of each connection between nodes.

In some embodiments, the structure learning process utilizes at least one of machine learning or manual effort. The Bayesian network model structure can, in some instances, be machine learned from an acquired or given set of data. In some cases, manual effort can specify the structure of the Bayesian network model, such as by selecting nodes to be included in the model, identifying connections between nodes, and/or assigning directionalities for the connections.

Moreover, the parameter learning module 204 can be configured to perform the parameter learning process to train the Bayesian network model. In some embodiments, the parameter learning process can facilitate determining probabilities associated with the Bayesian network model based on given or acquired data, which can be acquired by the data acquisition module 206. In some instances, the given or acquired data can change over time, which can cause the Bayesian network model to be updated over time. More details associated with parameter learning will be provided below with reference to FIG. 6.

As discussed, the data acquisition module 206 can be configured to acquire data useful for generating, developing, and/or training the Bayesian network model. The data acquisition module 206 can acquire a set of data (i.e., a given set of data). In some instances, the set of data can be used to provide "ground truth," which can refer to the accuracy of the training set's classification for supervised learning techniques. The acquired or given set of data can be considered the proper or appropriate objective data. In some cases, the set of data or at least a subset thereof can be acquired from the Residential Energy Consumption Survey (RECS). In some instances, the set of data can be utilized by the structure learning module 202 during the structure learning process and/or by the parameter learning module 204 during the parameter learning process.

Figure 3:
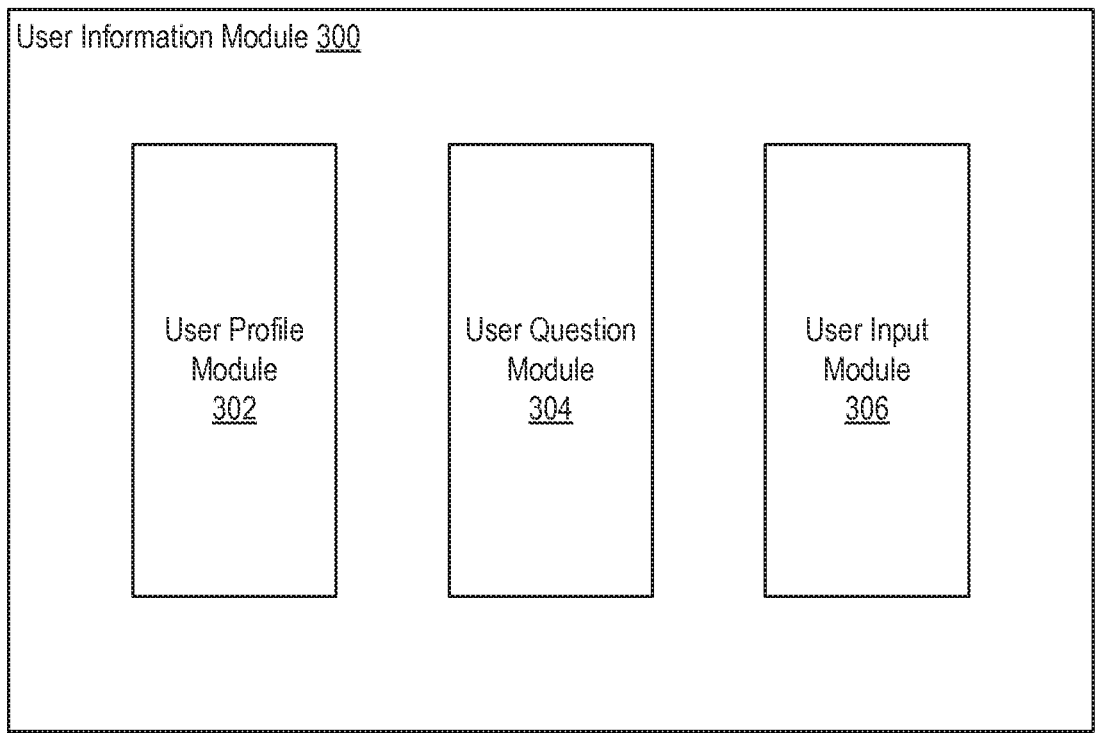
FIG. 3 illustrates an example user information module configured to facilitate determining disaggregated energy consumption based on limited data, in accordance with an embodiment of the present disclosure.

FIG. 3 illustrates an example user information module 300 configured to facilitate determining disaggregated energy consumption based on limited data, in accordance with an embodiment of the present disclosure. In some embodiments, the user information module 104 of FIG. 1 can be implemented as the example user information module 300. As shown in FIG. 3, the example user information module 300 can include a user profile module 302, a user question module 304, and a user input module 306.

The user profile module 302 can be configured to obtain, receive, and/or acquire profile information associated with a user, such as a utility company customer who consumes energy or who has a property, business, household, etc., that consumes energy. Profile information associated with the user can include, but is not limited to, the user's name, contact information, location, age, gender, and other information regarding the services or products provided to the user by the utility company. In some cases, the user can provide or input the user profile information. In some instances, the user profile information can be stored, such as by the user information module 300 and/or by a data store of the utility company.

The user question module 304 can be configured to provide, prompt, and/or transmit one or more questions to the user. As discussed above, when the Bayesian network model is provided with more information, the Bayesian network model can make a more accurate inference, estimate, or determination of energy consumption values for various energy consumption sources. In one example, if the user information module 300 recognizes that particular pieces of information associated with the user, and with a property of interest, such as a home or a business, associated with the user, are not yet known, then the user information module 300 can cause the user question module 304 to prompt the user with one or more questions.

In some embodiments, the one or more questions can include "yes or no" questions. In one example, the user question module 304 can prompt the user with questions such as "Do you have a space heater?", "Do you have air-conditioning?", "Do you have a gas stove?", etc. In some instances, a "yes or no" question asked by the user question module 304 can provide additional information associated with the user. For example, if the user question module 304 asks the user, "Do you rent?", and the user replies positively, then it can be inferred that the user most likely does not own the particular property of interest. Conversely, if the user question module 304 asks the user, "Do you rent?", and the user replies negatively, then it can be inferred that the user most likely owns the relevant property. In some cases, different questions can serve the same or a similar purpose. For example, the user question module 304 can ask the user, "Do you own this property?", which can serve the same or a similar purpose as the question "Do you rent this property?", because a user response or input to either of these questions should inform whether the user owns or rents the property. It should be appreciated that many variations are possible.

In some embodiments, the one or more questions can include non-"yes or no" questions, such as questions that solicit ranged responses. For example, a question to the user can be "Was your property built before 1965? Between 1965 and 2000? Or after 2000?". In another example, a question can be "How many occupants (including yourself) are there on your property?". The user can select a response or input: "1", "2", "3", "4", "5 or more", etc. In some cases, a similar type of question can be provided in different ways, based on what is known about the user (and his or her property). For example, if it is known that the user is a home user, then a question about occupancy can be "How many household members (including yourself) are living at this property?" If it is known that the user is a business user, then the question about occupancy can be "How many personnel (including yourself) work at this property?" Again, it is contemplated that number variations are possible.

Furthermore, the user input module 306 can be configured to retrieve, receive, and/or acquire one or more inputs or responses from the user. The one or more inputs or responses can be included as information associated with the user. As such, the Bayesian network model can utilize at least some of the inputs provided by the user to make a more accurate inference, estimation, or determination of disaggregated energy consumption values for energy consumption sources associated with the user. In some instances, the user can provide the inputs on his or her own. In some cases, the user can provide the inputs in response to one or more questions from the user question module 304.

In some embodiments, the one or more inputs from the user can include at least one of a housing type input, a square-footage input, a rent-or-own input, an occupant amount input, a fridge amount input, an air-conditioning input, or a heating input. For example, the housing type input can indicate whether the property is a single house, an apartment, a condominium, a townhouse, etc. The square-footage input can indicate the square footage for the property. The rent-or-own input can indicate whether the user rents or owns the property. The occupant amount input can indicate the occupancy quantity at the property. The fridge amount input can specify the quantity of refrigerators at the property. The air-conditioning input can inform whether or not the property has air-conditioning. The heating input can provide information about heating at the user's property. The heating input can include, for example, an electric property heater input, an electric space heater input, an electric water heater input, a gas property heater input, a gas space heater input, and/or a gas water heater input, etc. It should be understood that there can be many other possibilities.

Figure 4:
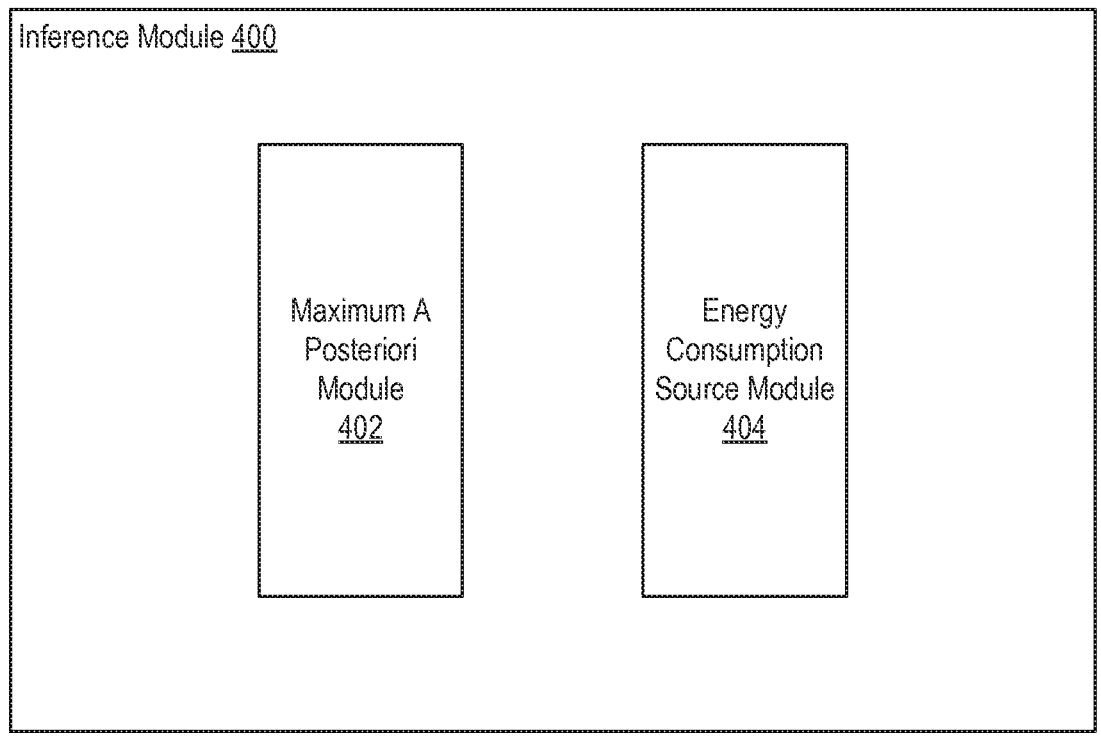
FIG. 4 illustrates an example inference module configured to facilitate determining disaggregated energy consumption based on limited data, in accordance with an embodiment of the present disclosure.

FIG. 4 illustrates an example inference module 400 configured to facilitate determining disaggregated energy consumption based on limited data, in accordance with an embodiment of the present disclosure. In some embodiments, the inference module 106 of FIG. 1 can be implemented as the example inference module 400. As shown in the example of FIG. 4, the inference module 400 can include a maximum a posteriori module 402 and an energy consumption source module 404.

The inference module 400 can be configured to facilitate inferring a plurality of energy consumption values for a plurality of energy consumption sources associated with the user. The inferring of the plurality of energy consumption values can be based on the inputting of at least the portion of the information into the Bayesian network model.

In some embodiments, each of the plurality of energy consumption values for the plurality of energy consumption sources can be represented as nodes in the Bayesian network model. In some cases, the energy consumption values are unknown or not yet determined, inferred, or estimated. The inference module 400 can be configured to utilize a Bayesian inference process to facilitate the inferring of the plurality of energy consumption values.

In some implementations, the inferring of the plurality of energy consumption values can include applying a maximum a posteriori estimation process to the Bayesian network model to acquire the plurality of energy consumption values for the plurality of energy consumption sources associated with the user. In general, with respect to the Bayesian network model, the maximum a posteriori estimation process can correspond to a mode of a posterior distribution. The maximum a posteriori estimation process can be utilized to acquire a point estimate of an unobserved quantity on the basis of empirical data. In one example, one or more of the energy consumption values for the energy consumption sources are unknown. The maximum a posteriori estimation process can determine, infer, or estimate the most likely values for the one or more unknown energy consumption values based on available information, such as the limited data (e.g., aggregated monthly energy billing data). As such, the disaggregated energy consumption values can be determined, inferred, or estimated from an aggregated energy consumption value using the maximum a posteriori estimation process. It is appreciated that many variations are possible.

Moreover, in some embodiments, the inferring of the plurality of energy consumption values can be performed without installing additional equipment for the user. For example, limited data (e.g., daily, monthly, or yearly energy billing data) can be provided as input into the Bayesian network model along with other data (e.g., user profile information, user property information, etc.). The plurality of energy consumption values can still be inferred, estimated, or determined even when the user has not installed any additional sensors, such as special, non-standard, uncommon, and/or propriety energy consumption sensors or other equipment.

Furthermore, having determined, inferred, or estimated the disaggregated energy consumption values for the energy consumption sources, the energy consumption source module 404 can store, provide, and/or otherwise process the disaggregated energy consumption values. For example, the energy consumption source module 404 can be configured to present or display the disaggregated energy consumption values for the energy consumption sources to the user or customer. Many variations are possible.

Figure 5A:
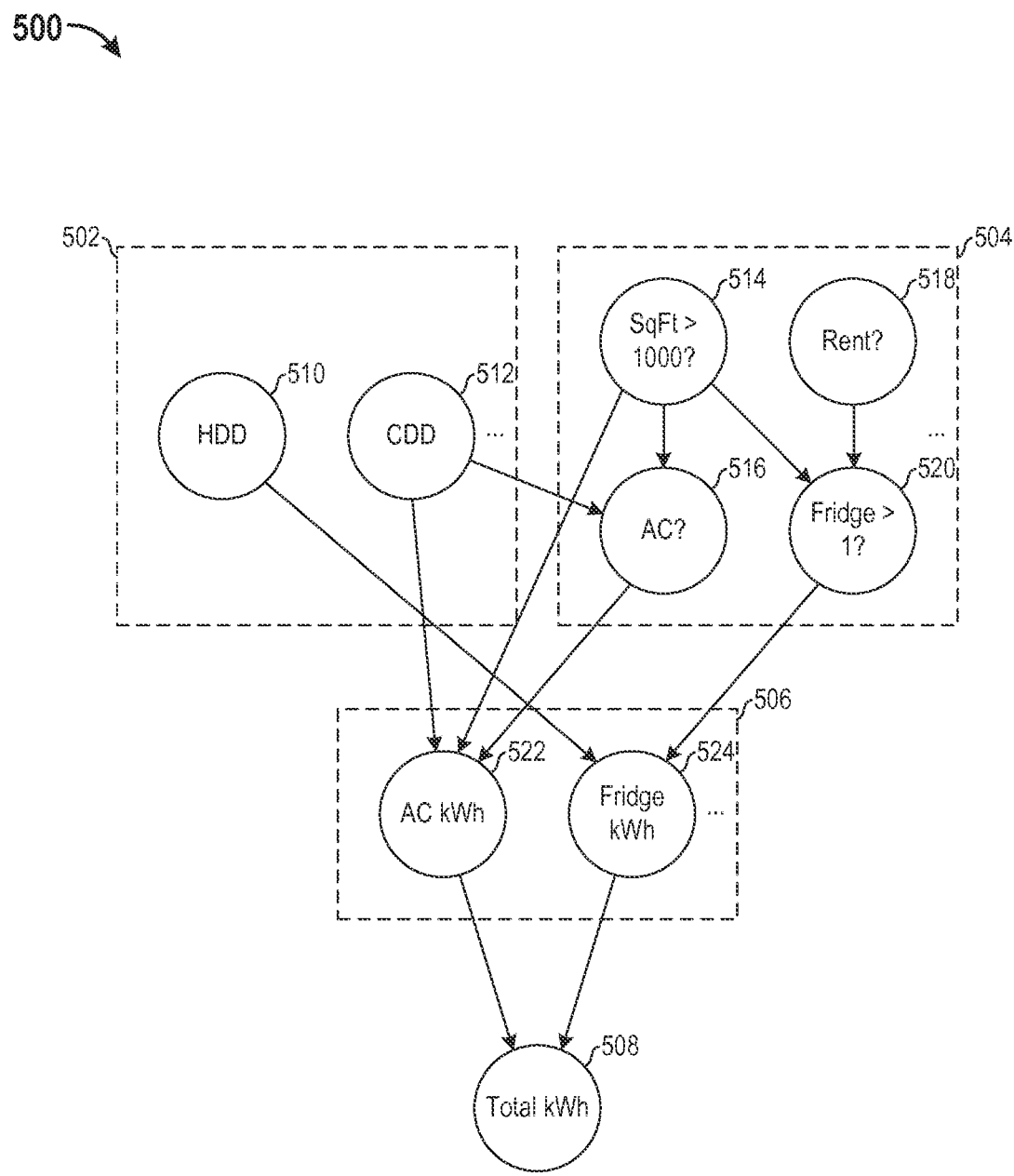
FIG. 5A illustrates an example scenario including an example representation of a Bayesian network useful for determining disaggregated energy consumption based on limited data, in accordance with an embodiment of the present disclosure.

FIG. 5A illustrates an example scenario 500 including an example representation of a Bayesian network useful for determining disaggregated energy consumption based on limited data, in accordance with an embodiment of the present disclosure. As shown in the example scenario 500, the representation of the Bayesian network can include nodes and edges. The nodes can represent various features, variables, or values, and the edges can indicate how some nodes are influenced by, affected by, and/or dependent upon other nodes. It should be understood that the example scenario 500 including the example Bayesian network representation is provided for illustrative purposes and that the Bayesian network representation is simplified for this example. It should be appreciated that many variations, possibilities, and/or modifications are possible.

In some embodiments, the example representation of the Bayesian network can include nodes that represent a set of external features 502, a set of user features 504 (also known as home features for a home user, or business features for a business user, etc.), a set of disaggregated energy consumption values 506, and an aggregated energy consumption value 508. The set of external features 502 can have values that are known, knowable, or acquirable, such as values calculable from weather conditions. The set of user features 504 can have values that may or may not be known. The set of user feature nodes 504 can represent information associated with the user, including information about the user's property; household, business, energy consumption habits, energy consumption sources or components, etc. Moreover, each disaggregated energy consumption value in the set of disaggregated energy consumption values 506 can represent how much energy is consumed by a particular energy consumption source or component associated with the user, such as electricity consumption due to air-conditioning at the user's property, gas consumption due to gas space heating at the user's property, or electricity consumption due to lighting at the user's property, etc. The disaggregated energy consumption values 506 are initially unknown and will be attempted to be determined, inferred, or estimated by the disclosed technology.

Furthermore, the aggregated (or total) energy consumption value 508 can be included as information associated with the user. In some cases, the aggregated energy consumption value 508 can correspond to limited data, in that it is only available at daily, monthly, or yearly internals. In some instances, the aggregated energy consumption value 508 can be associated with billing information, such as a monthly energy consumption bill for the user. As discussed above, the aggregated energy consumption value 508 can be used to determine, infer, or estimate the disaggregated energy consumption values 506.

As discussed previously, the structure of the Bayesian network can be generated, learned, or developed in the structure learning process. As shown in the example scenario 500, the structure of the Bayesian network representation can already be generated, learned, or developed. For example, the nodes, the edges, and the directionalities of the edges, etc., are already defined or configured in the example scenario 500. In some instances, the structure learning process can utilize manual effort and/or human intuition to generate or develop the structure of the Bayesian network. In some cases, machine learning can be utilized to generate or develop the structure of the Bayesian network. Moreover, it should be appreciated that the Bayesian network can be updated over time as the given data and/or the information associated with the user changes over time.

In the example scenario 500, there are two external feature nodes, Heating Degree Day (HDD) 510 and Cooling Degree Day (CDD) 512, which can be known, obtainable, or calculable, such as based on the given data. Although two external features or properties are illustrated in this example scenario 500, other examples of external features or properties can include, but are not limited to a year-made metric, a building type metric, a locational metric, and a climate metric.

In general, HDD can be a measurement or metric designed to reflect an amount of energy needed to heat a property (e.g., home, business, building, etc.), while CDD can reflect an amount of energy used to cool a property. Accordingly, in this example, the HDD value 510 can influence or affect the disaggregated electricity consumption by a refrigerator(s) 524 of the user. Moreover, the COD value 512 can influence or affect whether or not the user's property has air-conditioning (AC) 516 as well as the disaggregated electricity consumption by the user's AC 522.

Continuing with the example scenario 500, there can be a set of user features indicating whether or not the user's property is greater than 1000 in terms of square footage 514, whether the user's property has AC 516, whether the user rents 518 the property (as opposed to owning the property), and whether the user's property has more than one refrigerator or fridge 520. Some of these values can be known (e.g., provided by the user and/or acquired data), while others are not. In the example scenario 500, whether or not the property's square footage 514 is greater than 1000 can affect whether or not the property has AC 516, how much electricity is consumed by the AC 522, and whether or not the property has more than one fridge 520. Additionally, whether or not the property has AC 516 affects how much electricity is consumed by the AC 522. In this example, it has also been determined or learned that whether the user rents or not 518 can affect whether or not the user has more than one fridge 520. The quantity of the fridge (e.g., whether or not the property has more than one fridge) 520 can affect the electricity consumed by fridges 524. Again, many variations and other features are also possible.

Furthermore, in this example, there can be two disaggregated electricity consumption values, electricity consumption by AC 522 (measured in kilowatt-hours, kWh) and electricity consumption by refrigerating 524 (also measured in kWh). As described above, these two values can be influenced by, affected by, and/or dependent upon the external features 502 as well as the user features 504. Moreover, the disaggregated energy consumption values 522 and 524 can influence or affect the aggregate energy consumption value 508. For example, all of the disaggregated values can sum up to equal the aggregated value. Accordingly, these two values can be initially unknown, but can be determined, inferred, or estimated by an inference process that takes into consideration the aggregated value, which is known, provided, or acquirable.

Figure 5B:
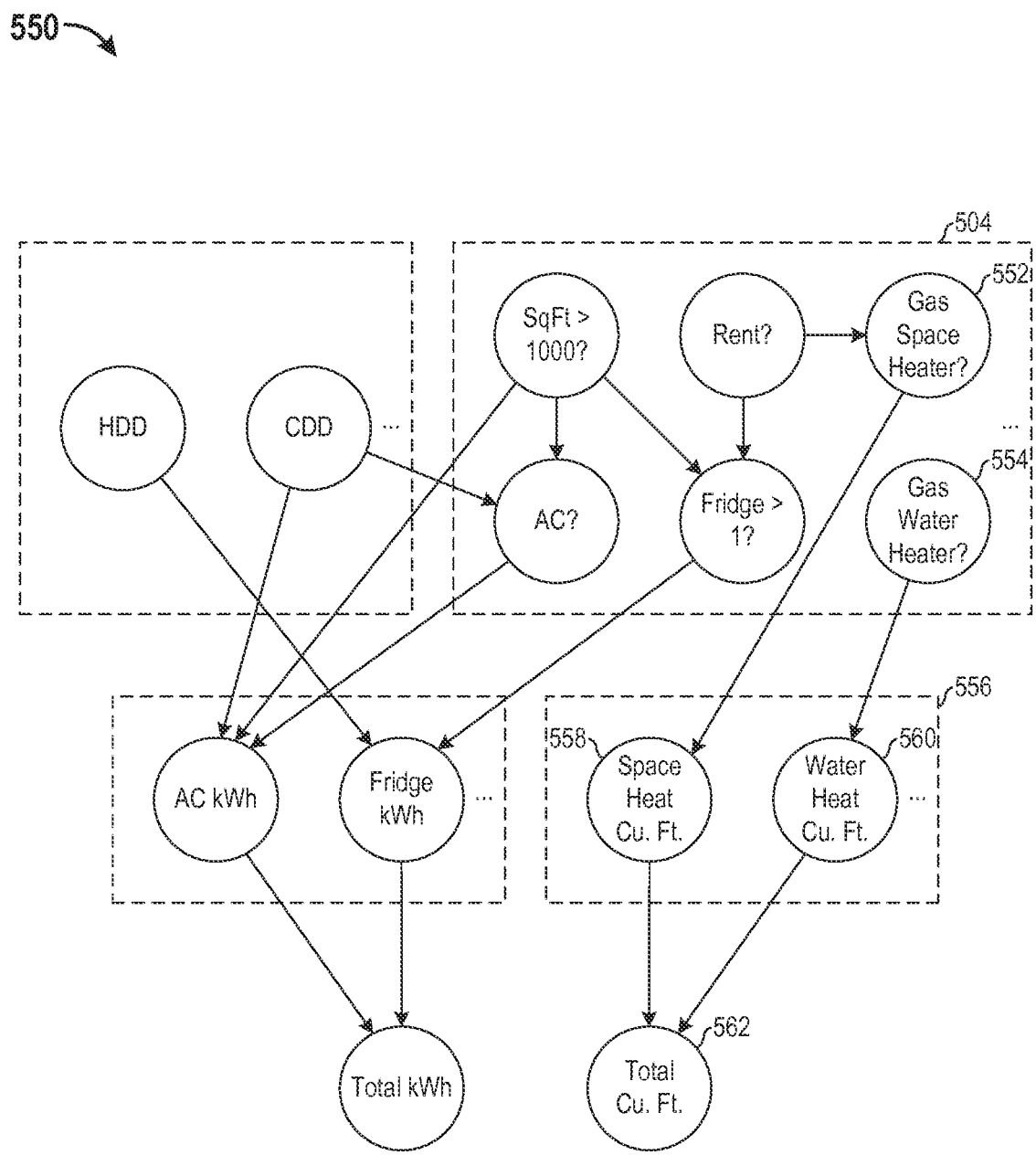
FIG. 5B illustrates an example scenario including an example representation of a Bayesian network useful for determining disaggregated energy consumption based on limited data, in accordance with an embodiment of the present disclosure.

FIG. 5B illustrates an example scenario 550 including an example Bayesian network useful for determining disaggregated energy consumption based on limited data, in accordance with an embodiment of the present disclosure. In some instances, at least a portion of the plurality of energy consumption sources is associated with at least one of an electric appliance or a gas appliance. The example scenario 500 of FIG. 5A illustrates energy consumption in the form of electrical consumption, while the example scenario 550 of FIG. 5B illustrates how energy consumption can incorporate electrical consumption as well as gas consumption.

In the example scenario 550, the set of user features 504 of the Bayesian network can include a feature representing whether or not the user's property has gas space heating 552 and a feature representing whether or not the user's property has gas water heating 554. Again, various features/nodes can influence or affect other features/nodes. In this example, it can be learned or determined that whether or not the user rents can affect whether or not there is gas space heating 552.

Moreover, the Bayesian network representation can include a set of disaggregated gas consumption values 556, which includes a disaggregated gas space heating consumption value 558 (measured in Cubic Feet, Cu. Ft.) and a disaggregated gas water heating consumption value 560 (also measured in Cu. Ft.). The gas space heating consumption value 558 can depend on whether or not the property has gas space heating 552. The gas water heating consumption value 560 can depend on whether or not the property has gas water heating 554. Moreover, the gas space heating consumption value 558 and the gas water heating consumption value 560 can affect the aggregated or total gas consumption value 562. For example, the disaggregated gas space heating consumption value 558 and the disaggregated gas water heating consumption value 560 can be summed together to produce the aggregated gas consumption value 562.

The disaggregated gas space heating consumption value 558 and the disaggregated gas water heating consumption value 560 are initially unknown, but can be determined, inferred, or estimated based, at least in part, on the known or acquirable aggregated gas consumption value 562 and other feature values. Again, it is understood that many variations are possible.

Figure 6:
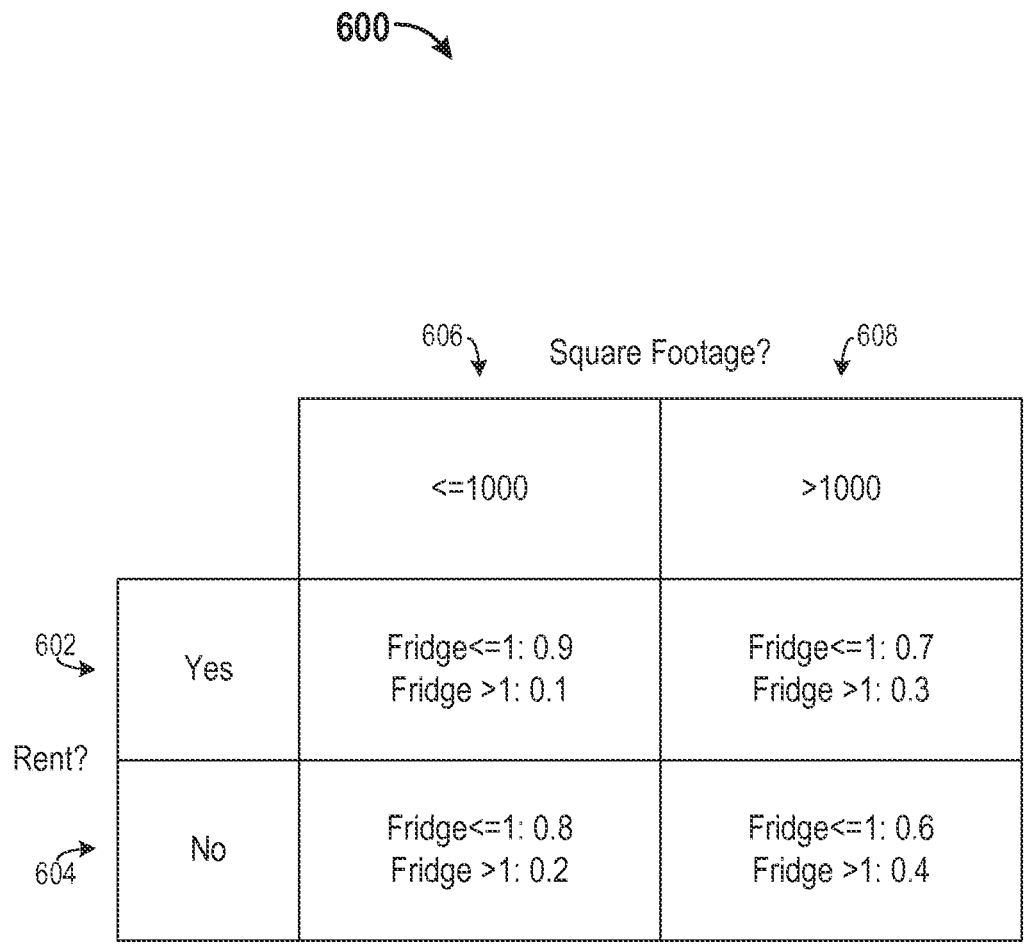
FIG. 6 illustrates an example data structure portion associated with determining disaggregated energy consumption based on limited data, in accordance with an embodiment of the present disclosure.

FIG. 6 illustrates an example data structure portion 600 associated with determining disaggregated energy consumption based on limited data, in accordance with an embodiment of the present disclosure. In the example of FIG. 6, the data structure portion 600 can correspond to a table portion. It is contemplated that there can be numerous variations.

In some embodiments, the example table portion can be utilized during the parameter learning process, which facilitates the developing, learning, and/or training of the Bayesian network model. During the parameter learning process, probabilities associated with the Bayesian network model can be determined or calculated based on some given data. In some instances, a given set of data can be represented in the Bayesian network model, such as by virtue of being used to train the Bayesian network model. In some cases, at least a first subset of the given set of data can influence, in the Bayesian network model, at least a second subset of the given set of data.

In the example of FIG. 6, the table portion can be configured to store various probabilities associated with the Bayesian network model. In some cases, the probabilities can be determined based on counting certain instances or occurrences of correlations between features represented in the given data. The particular example table portion 600 illustrates the probabilities of having more than one fridge based on the user property's square footage and whether or not the user rents. Other table portions and/or other data structure portions can be utilized for determining other probabilities.

In one example, the given set of data can include 100 instances (e.g., or occurrences, accounts, etc.) in which a user rents 602 and has a property square footage 606 of less than or equal to 1000. Out of these 100 instances, 90 of them involve the respective user property having one or fewer fridges while 10 of them involve the respective user property having greater than one fridge. As such, in the table cell corresponding to renting 602 and <=1000 square footage 606, the probability of having one or fewer fridges is 90% and that of having more than one fridge is 10%. The given data can also include, for example, 50 instances in which the user does not rent 604 and has <=1000 square footage 606. Out of these 50 instances, 40 of them involve one or fewer fridges and 10 of them involve more than one fridge. As such, the probabilities are 80% for Fridge<=1 and 20% for Fridge>1. Moreover, the example table portion shows that for renting 602 and >1000 square footage 608, it has been determined that the probability for Fridge<=1 is 70% and that for Fridge>1 is 30%. For not renting 604 and >1000 square footage 608, the probabilities are 60% for Fridge<=1 and 40% for Fridge>1. Based at least in part on these probabilities (and other probabilities not explicitly illustrated in the example of FIG. 6), the Bayesian network model can be generated, developed, and/or trained.

As discussed, in some cases, the given data from which probabilities are determined can be acquired from sources such as the Residential Energy Consumption Survey (RECS). In some cases, the given set of data can include at least one of an acquired set of energy consumption data associated with a plurality of users or an acquired set of external properties or features. Furthermore, in some cases, the acquired set of energy consumption data associated with the plurality of users can include, but is not limited to, at least one of a housing type metric, a square-footage metric, a rent-or-own metric, an occupant amount metric, a fridge amount metric, an air-conditioning metric, and/or a heating metric, etc.

Figure 7:
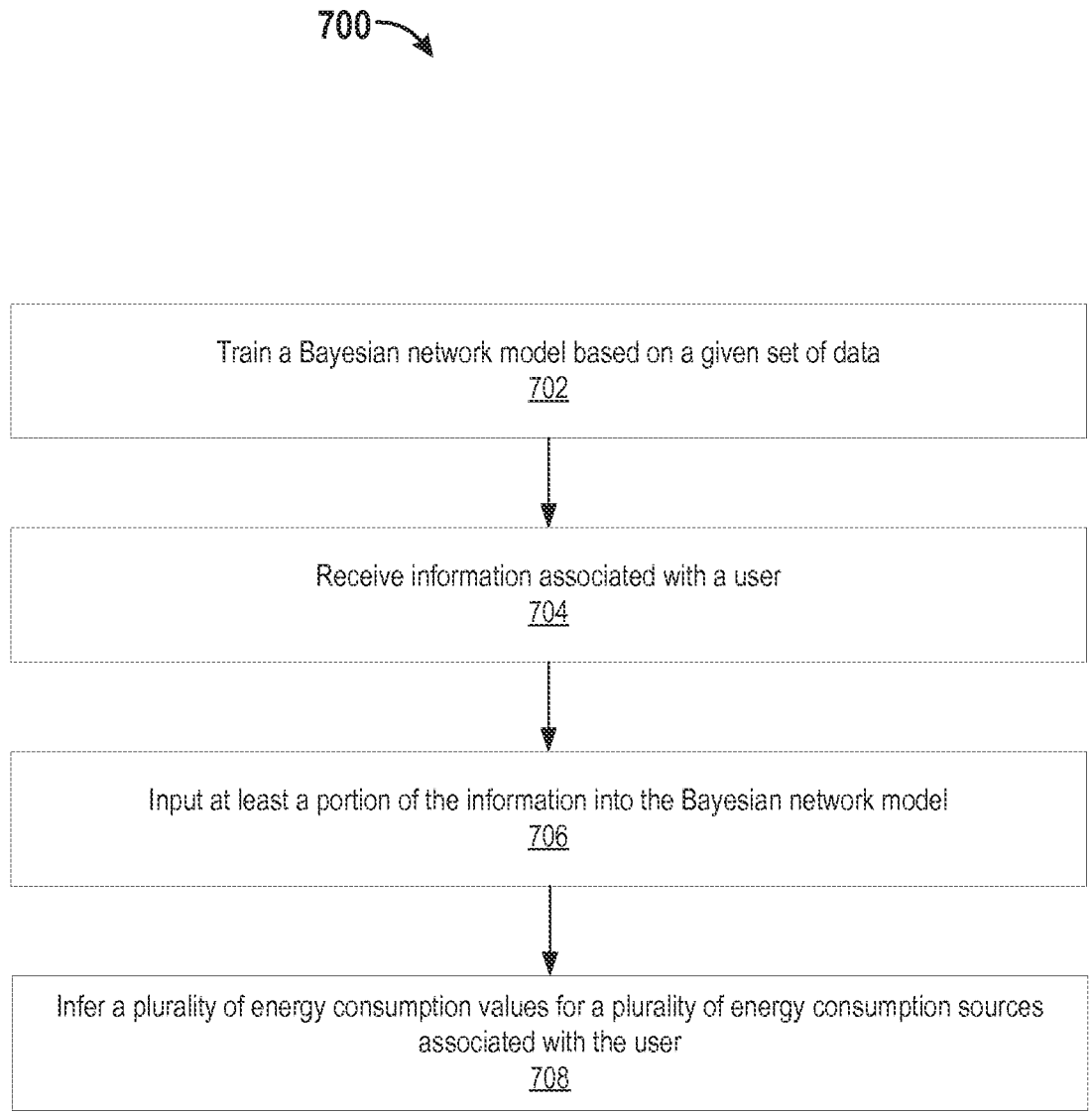
FIG. 7 illustrates an example method associated with determining disaggregated energy consumption based on limited data, in accordance with an embodiment of the present disclosure.

FIG. 7 illustrates an example method 700 associated with determining disaggregated energy consumption based on limited data, in accordance with an embodiment of the present disclosure. It should be understood that there can be additional, fewer, or alternative steps performed in similar or alternative orders, or in parallel, within the scope of the various embodiments unless otherwise stated.

At block 702, the example method 700 can train a Bayesian network model based on a given set of data. At block 704, the example method 700 can receive information associated with a user. In some instances, the information can include aggregated energy consumption data at one or more low frequency time intervals. At block 706, the example method 700 can input at least a portion of the information into the Bayesian network model. At block 708, the example method 700 can infer a plurality of energy consumption values for a plurality of energy consumption sources associated with the user based on the inputting of the at least the portion of the information into the Bayesian network model.

It is further contemplated that there can be many other uses, applications, and/or variations associated with the various embodiments of the present disclosure. For example, in some embodiments, instead of a Bayesian network model, one or more other influence diagrams or network models can be utilized. It is understood that there can be many other possibilities.

Furthermore, as discussed above, the example energy disaggregation module 100 of FIG. 1 can be implemented, in part or in whole, as software, hardware, or any combination thereof. In some embodiments, the energy disaggregation module 100 can be implemented with an energy management platform, such as the energy management platform 802 of FIG. 8. It is contemplated that many variations are possible.

Example Energy Management Platform

Figure 8:
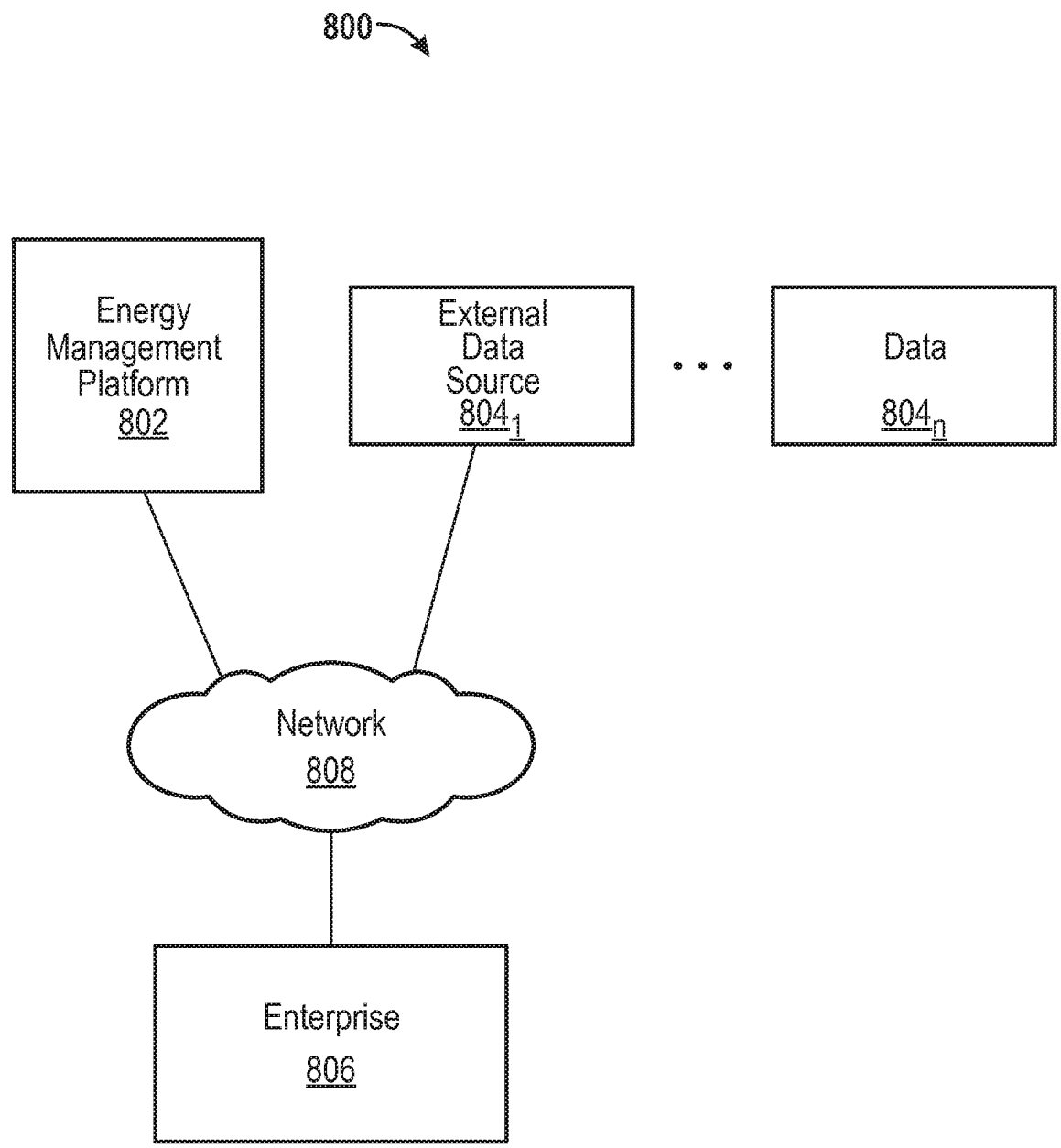
FIG. 8 illustrates an example environment for energy management, in accordance with an embodiment of the present disclosure.

FIG. 8 illustrates an example environment 800 for energy management, in accordance with an embodiment of the present disclosure. The environment 800 includes an energy management platform 802, external data sources 804$_{1-n}$, an enterprise 806, and a network 808. The energy management platform 802 can provide functionality to allow the enterprise 806 to track, analyze, and optimize energy usage of the enterprise 806. The energy management platform 802 may constitute an analytics platform. The analytics platform may handle data management, multi-layered analysis, and data visualization capabilities for all applications of the energy management platform 802. The analytics platform may be specifically designed to process and analyze significant volumes of frequently updated data while maintaining high performance levels.

The energy management platform 802 may communicate with the enterprise 806 through user interfaces (UIs) presented by the energy management platform 802 for the enterprise 806. The UIs may provide information to the enterprise 806 and receive information from the enterprise 806. The energy management platform 802 may communicate with the external data sources 804$_{1-n}$ through APIs and other communication interfaces. Communications involving the energy management platform 802, the external data sources 804$_{1-n}$, and the enterprise 806 are discussed in more detail herein.

The energy management platform 802 may be implemented as a computer system, such as a server or series of servers and other hardware (e.g., applications servers, analytic computational servers, database servers, data integrator servers, network infrastructure (e.g., firewalls, routers, communication nodes)). The servers may be arranged as a server farm or cluster. Embodiments of the present disclosure may be implemented on the server side, on the client side, or a combination of both. For example, embodiments of the present disclosure may be implemented by one or more servers of the energy management platform 802. As another example, embodiments of the present disclosure may be implemented by a combination of servers of the energy management platform 802 and a computer system of the enterprise 806.

The external data sources $804_{1-n}$ may represent a multitude of possible sources of data relevant to energy management analysis. The external data sources $804_{1-n}$ may include, for example, grid and utility operational systems, meter data management (MDM) systems, customer information systems (CIS), billing systems, utility customer systems, utility enterprise systems, utility energy conservation measures, and rebate databases. The external data sources $804_{1-n}$ also may include, for example, building characteristic systems, weather data sources, third-party property management systems, and industry-standard benchmark databases.

The enterprise 806 may represent a user (e.g., customer) of the energy management platform 802. The enterprise 806 may include any private or public concern, such as large companies, small and medium businesses, households, individuals, governing bodies, government agencies, non-governmental organizations, nonprofits, etc. The enterprise 806 may include energy providers and suppliers (e.g., utilities), energy service companies (ESCOs), and energy consumers. The enterprise 806 may be associated with one or many facilities distributed over many geographic locations. The enterprise 806 may be associated with any purpose, industry, or other type of profile.

The network 808 may use standard communications technologies and protocols. Thus, the network 808 may include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 808 may include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 808 may be represented using technologies and/or formats including hypertext markup language (HTML) and extensible markup language (XML). In addition, all or some links may be encrypted using conventional encryption technologies such as secure sockets layer (SSL), transport layer security (TLS), and Internet Protocol security (IPsec).

In an embodiment, each of the energy management platform 802, the external data sources $804_{1-n}$, and the enterprise 806 may be implemented as a computer system (or device). The computer system (or device) may include one or more machines, each of which may be implemented as machine 1100 of FIG. 11, which is described in further detail herein.

Figure 9:
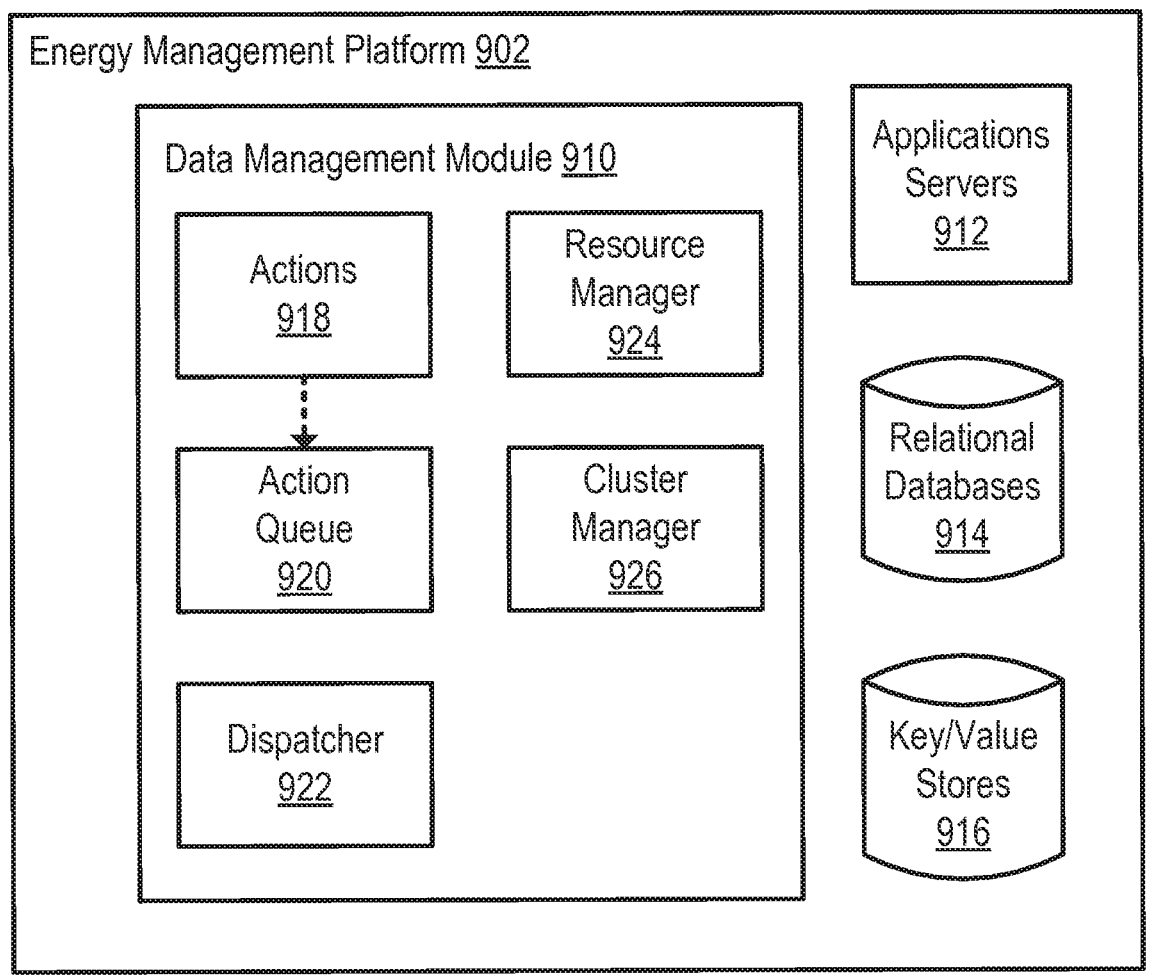
FIG. 9 illustrates an example energy management platform, in accordance with an embodiment of the present disclosure.

FIG. 9 illustrates an example energy management platform 902, in accordance with an embodiment of the present disclosure. In some embodiments, the example energy management platform 902 can be implemented as the energy management platform 802 of FIG. 8. In an embodiment, the energy management platform 902 may include a data management module 910, applications servers 912, relational databases 914, and key/value stores 916. In some embodiments, the energy management platform 902 can also include an energy disaggregation module (e.g., the energy disaggregation module 100 of FIG. 1).

The data management module 910 may support the capability to automatically and dynamically scale a network of computing resources for the energy management platform 902 according to demand on the energy management platform 902. The dynamic scaling supported by the data management module 910 may include the capability to provision additional computing resources (or nodes) to accommodate increasing computing demand. Likewise, the data management module 910 may include the capability to release computing resources to accommodate decreasing computing demand. The data management module 910 may include one or more action(s) 918, a queue 920, a dispatcher 922, a resource manager 924, and a cluster manager 926.

The actions 918 may represent the tasks that are to be performed in response to requests that are provided to the energy management platform 902. Each of the actions 918 may represent a unit of work to be performed by the applications servers 912. The actions 918 may be associated with data types and bound to engines (or modules). The requests may relate to any task supported by the energy management platform 902. For example, the request may relate to, for example, analytic processing, loading energy-related data, retrieving an energy star reading, retrieving benchmark data, etc. The actions 918 are provided to the action queue 920.

The action queue 920 may receive each of the actions 918. The action queue 920 may be a distributed task queue and represents work that is to be routed to an appropriate computing resource and then performed.

The dispatcher 922 may associate and hand-off a queued action to an engine that will execute the action. The dispatcher 922 may control routing of each queued action to a particular one of the applications servers 912 based on load balancing and other optimization considerations. The dispatcher 922 may receive an instruction from the resource manager 924 to provision new nodes when the current computing resources are at or above a threshold capacity. The dispatcher 922 also may receive an instruction from the resource manager to release nodes when the current computing resources are at or below a threshold capacity. The dispatcher 922 accordingly may instruct the cluster manager 926 to dynamically provision new nodes or release existing nodes based on demand for computing resources. The nodes may be computing nodes or storage nodes in connection with the applications servers 912, the relational databases 914, and the key/value stores 916.

The resource manager 924 may monitor the action queue 920. The resource manager 924 also may monitor the current load on the applications servers 912 to determine the availability of resources to execute the queued actions. Based on the monitoring, the resource manager may communicate, through the dispatcher 922, with the duster manager 926 to request dynamic allocation and de-allocation of nodes.

The duster manager 926 may be a distributed entity that manages all of the nodes of the applications servers 912. The duster manager 926 may dynamically provision new nodes or release existing nodes based on demand for computing resources. The duster manager 926 may implement a group membership services protocol. The duster manager 926 also may perform a task monitoring function. The task monitoring function may involve tracking resource usage, such as CPU utilization, the amount of data read/written, storage size, etc.

The applications servers 912 may perform processes that manage or host analytic server execution, data requests, etc. The engines provided by the energy management platform 902, such as the engines that perform data services, batch processing, stream services, may be hosted within the applications servers 912. The engines are discussed in more detail herein.

In an embodiment, the applications servers 912 may be part of a computer duster of a plurality of loosely or tightly connected computers that are coordinated to work as a system in performing the services and applications of the energy management platform 902. The nodes (e.g., servers) of the duster may be connected to each other through fast local area networks ("LAN"), with each node running its own instance of an operating system. The applications servers 912 may be implemented as a computer duster to improve performance and availability over that of a single computer, while typically being more cost-effective than single computers of comparable speed or availability. The applications servers 912 may be software, hardware, or a combination of both.

The relational databases 914 may maintain various data supporting the energy management platform 902. In an embodiment, non-time series data may be stored in the relational databases 914, as discussed in more detail herein.

The key/value stores 916 may maintain various data supporting the energy management platform 902. In an embodiment, time series data (e.g., meter readings, meter events, etc.) may be stored in the key/value store, as discussed in more detail herein. In an embodiment, the key/value stores 916 may be implemented with Apache Cassandra, an open source distributed database management system designed to handle large amounts of data across a multitude of commodity servers. In an embodiment, other database management systems for key/value stores may be used.

In an embodiment, one or more of the applications servers 912, the relational databases 914, and the key/value stores 916 may be implemented by the entity that owns, maintains, or controls the energy management platform 902.

In an embodiment, one or more of the applications servers 912, the relational databases 914, and the key/value stores 916 may be implemented by a third party that may provide a computing environment for lease to the entity that owns, maintains, or controls the energy management platform 902. In an embodiment, the applications servers 912, the relational databases 914, and the key/value stores 916 implemented by the third party may communicate with the energy management platform 902 through a network, such as the network 808 of FIG. 8.

The computing environment provided by the third party for the entity that owns, maintains, or controls the energy management platform 902 may be a cloud computing platform that allows the entity that owns, maintains, or controls the energy management platform 902 to rent virtual computers on which to run its own computer applications. Such applications may include, for example, the applications performed by the applications servers 912, as discussed in more detail herein. In an embodiment, the computing environment may allow a scalable deployment of applications by providing a web service through which the entity that owns, maintains, or controls the energy management platform 902 can boot a virtual appliance used to create a virtual machine containing any software desired. In an embodiment, the entity that owns, maintains, or controls the energy management platform 902 may create, launch, and terminate server instances as needed, paying based on time usage time, data usage, or any combination of these or other factors. The ability to provision and release computing resources in this manner supports the ability of the energy management platform 902 to dynamically scale according to the demand on the energy management platform 902.

Figure 10:
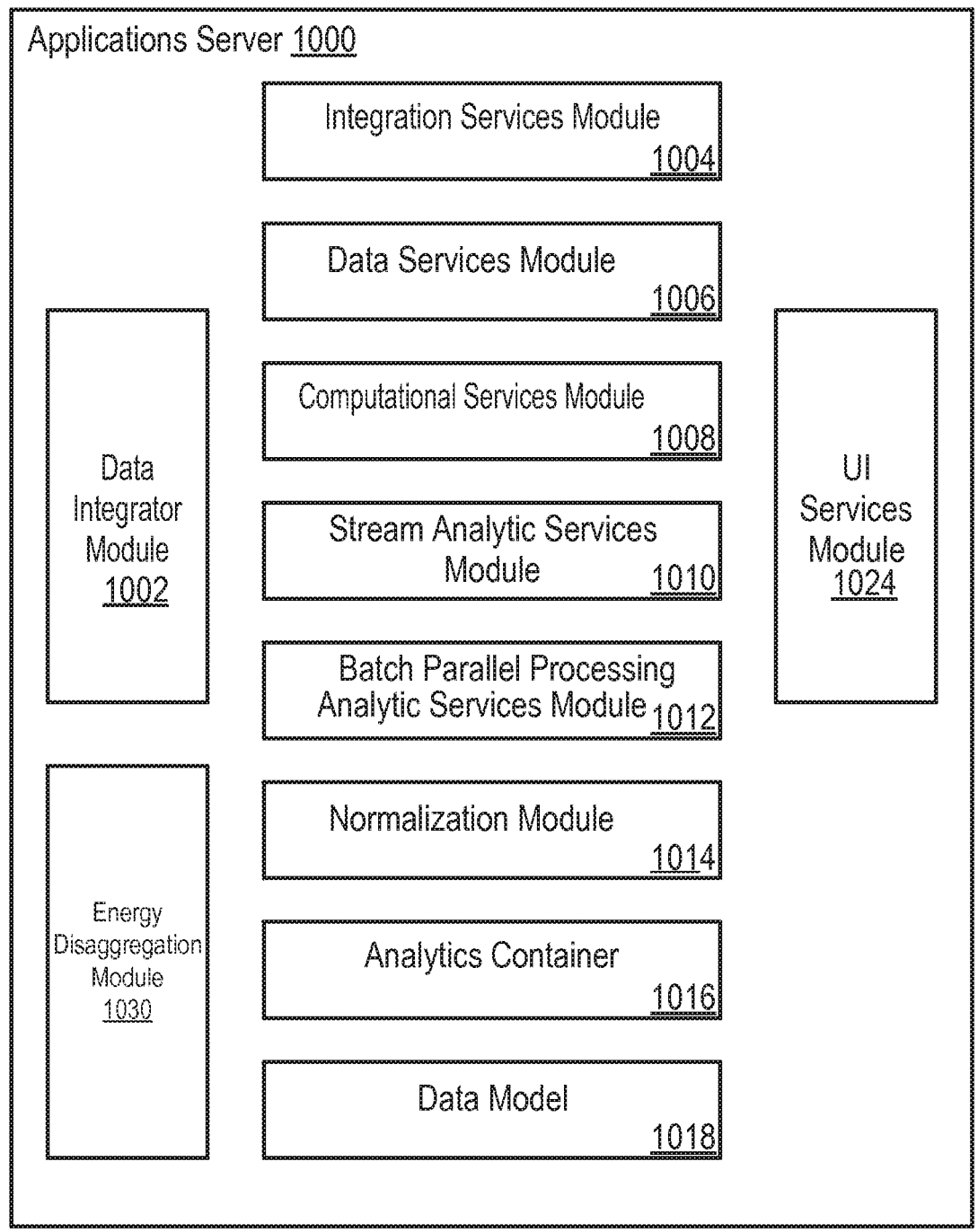
FIG. 10 illustrates an example applications server of an energy management platform, in accordance with an embodiment of the present disclosure.

FIG. 10 illustrates an example applications server 1000 of an energy management platform, in accordance with an embodiment of the present disclosure. In an embodiment, one or more of the applications servers 912 of FIG. 9 may be implemented with applications server 1000 of FIG. 10. The applications server 1000 includes a data integrator (data loading) module 1002, an integration services module 1004, a data services module 1006, a computational services module 1008, a stream analytic services module 1010, a batch parallel processing analytic services module 1012, a normalization module 1014, an analytics container 1016, a data model 1018, and a user interface (UI) services module 1024. In some embodiments, the applications server 1000 can also include an energy disaggregation module 1030. In some cases, the energy disaggregation module 1030 can be implemented as the energy disaggregation module 100 of FIG. 1.

In some embodiments, the analytics platform supported by the applications server 1000 includes multiple services that each handles a specific data management or analysis capability. The services include the data integrator module 1002, the integration services module 1004, the data services module 1006, the computational services module 1008, the stream analytic services module 1010, batch parallel processing analytic services module 1012, and the UI services module 1024. All or some services within the analytics platform may be modular and accordingly architected specifically to execute their respective capabilities for large data volumes and at high speed. The services may be optimized in software for high performance distributed computing over a computer cluster including the applications servers 912.

The modules and components of the applications server 1000 in FIG. 10 and all the figures herein are merely exemplary, and may be variously combined into fewer modules and components, or separated into additional modules and components. The described functionality of the modules and components may be performed by other modules and components.

Example Machine

Figure 11:
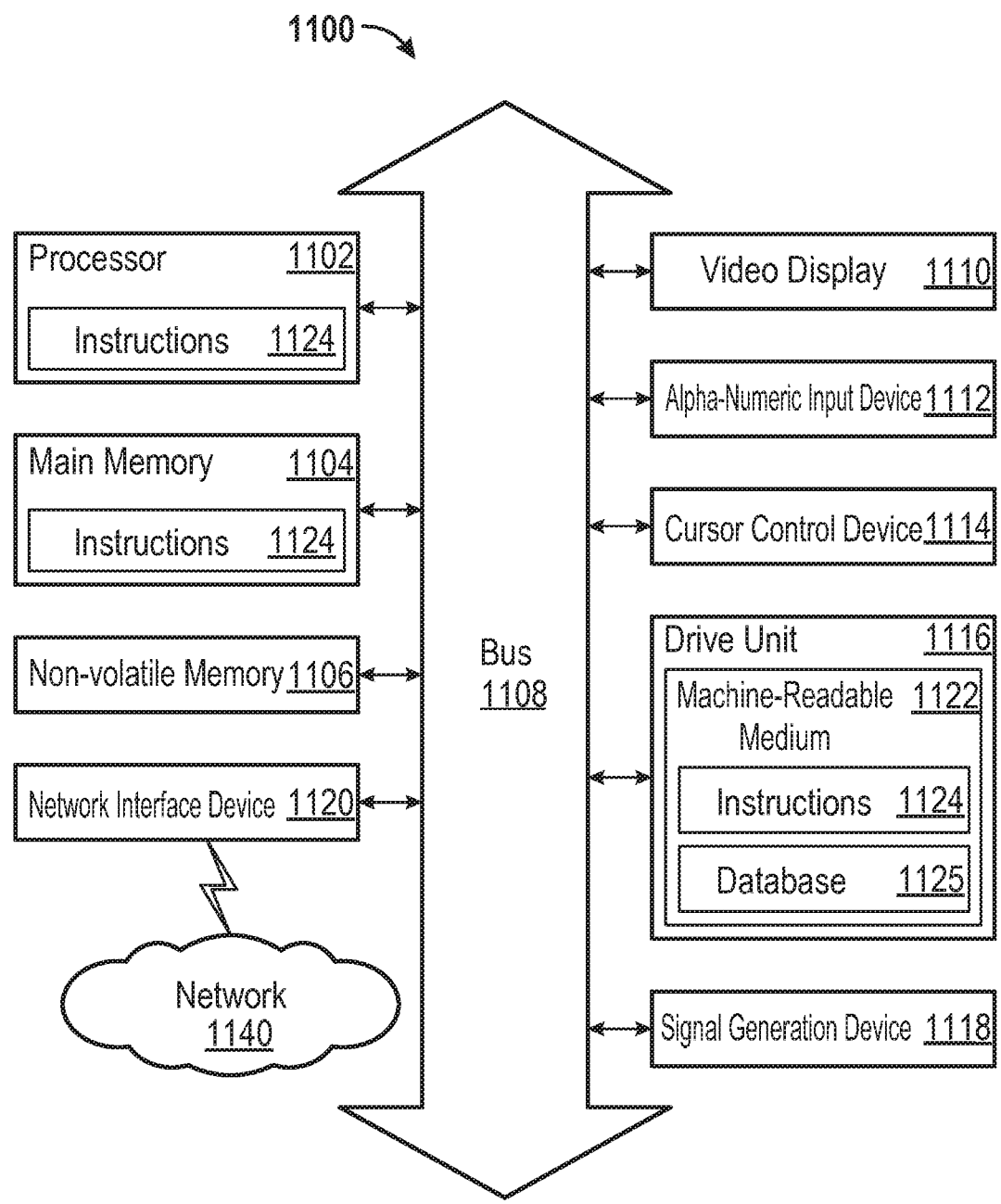
FIG. 11 illustrates an example machine within which a set of instructions for causing the machine to perform one or more of the embodiments described herein can be executed, in accordance with an embodiment of the present disclosure.

FIG. 11 illustrates an example machine 1100 within which a set of instructions for causing the machine to perform one or more of the embodiments described herein can be executed, in accordance with an embodiment of the present disclosure. The machine may be connected (e.g., networked) to other machines. In a networked deployment, the machine may operate in the capacity of a server or a client machine in a client-server network environment, or as a peer machine in a peer-to-peer (or distributed) network environment.

The machine 1100 includes a processor 1102 (e.g., a central processing unit (CPU), a graphics processing unit (CPU), or both), a main memory 1104, and a nonvolatile memory 1106 (e.g., volatile RAM and non-volatile RAM), which communicate with each other via a bus 1108. In some embodiments, the machine 1100 can be a desktop computer, a laptop computer, personal digital assistant (PDA), or mobile phone, for example. In one embodiment, the machine 1100 also includes a video display 1110, an alphanumeric input device 1112 (e.g., a keyboard), a cursor control device 1114 (e.g., a mouse), a drive unit 1116, a signal generation device 1118 (e.g., a speaker) and a network interface device 1120.

In one embodiment, the video display 1110 includes a touch sensitive screen for user input. In one embodiment, the touch sensitive screen is used instead of a keyboard and mouse. The disk drive unit 1116 includes a machine-readable medium 1122 on which is stored one or more sets of instructions 1124 (e.g., software) embodying any one or more of the methodologies or functions described herein. The instructions 1124 can also reside, completely or at least partially, within the main memory 1104 and/or within the processor 1102 during execution thereof by the computer system 1100. The instructions 1124 can further be transmitted or received over a network 1140 via the network interface device 1120. In some embodiments, the machine-readable medium 1122 also includes a database 1125.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 1122 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, the routines executed to implement the embodiments of the present disclosure can be implemented as part of an operating system or a specific application, component, program, object, module or sequence of instructions referred to as "programs" or "applications". For example, one or more programs or applications can be used to execute specific processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the present disclosure. Such changes are also implicitly included in the description. They still fall within the scope of the present disclosure. It should be understood that this disclosure is intended to yield a patent covering numerous aspects of the disclosed technology, both independently and as an overall system, and in both method and apparatus modes.

Further, each of the various elements of the present disclosure and claims may also be achieved in a variety of manners. This disclosure should be understood to encompass each such variation, be it a variation of an embodiment of any apparatus embodiment, a method or process embodiment, or even merely a variation of any element of these.

What is claimed is:

1. A computer-implemented method for predicting disaggregated energy consumption of a select user, comprising:
    acquiring, by a computing system, a set of data from a plurality of data sources, wherein the set of data comprises (1) energy consumption data associated with a plurality of other users and (2) external features including geophysical and building characteristics, wherein the set of data is dynamic and changes over time as the energy consumption data and the external features change or are being updated, and wherein the plurality of data sources comprise residential energy consumption surveys associated with the plurality of other users;
    training, by the computing system, a Bayesian network model based on the set of data, wherein the Bayesian network model corresponds to a probabilistic graphical model, and wherein the Bayesian network model is updated as the set of data changes over time;
    receiving, by the computing system, information associated with the select user at a frequency for a plurality of time intervals with each interval being greater than or equal to one day, wherein the information comprises a total actual energy consumption value in the select user's residence for each interval, wherein the information associated with the select user includes one or more inputs from the select user;
    inputting, by the computing system, the information into the Bayesian network model as the information is being received at the frequency for the plurality of time intervals, wherein the Bayesian network model is updated as the information associated with the select user changes over time; and
    predicting, by the computing system and using the Bayesian network model, a plurality of disaggregated energy consumption values for a plurality of different energy consumption sources that contribute to a total energy consumption in the select user's residence, wherein the plurality of disaggregated energy consumption values are predicted from the information comprising the total actual energy consumption value in the select user's residence for each interval, and wherein the plurality of disaggregated energy consumption values are used to aid the select user or an entity in monitoring and managing energy consumption within the select user's residence.

2. The computer-implemented method of claim 1, wherein the one or more inputs from the select user include at least one of a housing type input, a square-footage input, a rent-or-own input, an occupant amount input, a fridge amount input, an air-conditioning input, or a heating input.

3. The computer-implemented method of claim 1, wherein the plurality of intervals comprises different lengths of time.

4. The computer-implemented method of claim 1, wherein the training of the Bayesian network model includes at least one of a structure learning process or a parameter learning process.

5. The computer-implemented method of claim 4, wherein the structure learning process facilitates developing a structure of the Bayesian network model, and wherein the structure learning process utilizes at least one of machine learning or manual effort.

6. The computer-implemented method of claim 4, wherein the parameter learning process enables the training of the Bayesian network model, and wherein the parameter learning process utilizes at least a subset of the given set of data to determine probabilities associated with the Bayesian network model.

7. The computer-implemented method of claim 3, wherein the plurality of intervals comprises daily intervals, weekly intervals, monthly intervals, or yearly intervals.

8. The computer-implemented method of claim 1, wherein the total actual energy consumption value is obtained via billing information associated with the select user.

9. The computer-implemented method of claim 1, wherein the plurality of disaggregated energy consumption values for the plurality of different energy consumption sources are determined without requiring installation of additional equipment or energy consumption sensors for the select user.

10. The computer-implemented method of claim 1, wherein the determining of the plurality of disaggregated energy consumption values includes applying a maximum a posteriori estimation process to the Bayesian network model to determine the plurality of disaggregated energy consumption values for the plurality of different energy consumption sources associated with the select user.

11. The computer-implemented method of claim 1, wherein the set of data is represented in the Bayesian network model, and wherein at least a first subset of the set of data influences, in the Bayesian network model, at least a second subset of the set of data.

12. The computer-implemented method of claim 1, wherein the energy consumption data associated with the plurality of other users includes at least one of a housing type metric, a square-footage metric, a rent-or-own metric, an occupant amount metric, a fridge amount metric, an air-conditioning metric, or a heating metric.

13. The computer-implemented method of claim 1, wherein the external features include at least one of a heating degree day (HDD) metric, a cooling degree day (CDD) metric, a year-made metric, a building type metric, a locational metric, or a climate metric.

14. The computer-implemented method of claim 1, wherein the plurality of data sources comprises one or more of the following: grid and utility operational systems, meter data management (MDM) systems, customer information systems (CIS), billing systems, utility customer systems, utility enterprise systems, utility energy conservation measures, rebate databases, building characteristic systems, weather data sources, third-party property management systems, or industry-standard benchmark databases.

15. The computer-implemented method of claim 1, wherein at least some of the plurality of different energy consumption sources are associated with an electric appliance or a gas appliance.

16. The method of claim 1, wherein the probabilistic graphical model is a directed acyclic graph.

17. The method of claim 1, wherein the set of data further comprises inferred information that is inferred from partial or limited responses to the residential energy consumption surveys associated with the plurality of other users.

18. A system for predicting energy consumption of a select user, comprising:
  a server in communication with a plurality of data sources; and
  a memory storing instructions that, when executed by the server, cause the server to perform operations comprising:
    acquiring a set of data from the plurality of data sources, wherein the set of data comprises (1) energy consumption data associated with a plurality of other users and (2) external features including geophysical and building characteristics, wherein the set of data is dynamic and changes over time as the energy consumption data and the external features change or are being updated, and wherein the plurality of data sources comprise residential energy consumption surveys associated with the plurality of other users;
    training a Bayesian network model based on the set of data, wherein the Bayesian network model corresponds to a probabilistic graphical model, and wherein the Bayesian network model is updated as the set of data changes over time;
    receiving information associated with the select user at a frequency for a plurality of time intervals with each interval being greater than or equal to one day, wherein the information comprises a total actual energy consumption value in said select user's residence for each interval, wherein the information associated with the select user includes one or more inputs from the select user;
    inputting at least a portion of the information into the Bayesian network model as the information is being received, wherein the Bayesian network model is updated as the information associated with the select user changes over time; and
    predicting, using the Bayesian network model, a plurality of disaggregated energy consumption values for each of a plurality of energy consumption sources that contribute to the total energy consumption value in the select user's residence, wherein the plurality of disaggregated energy consumption values are predicted from the information comprising the total actual energy consumption value, wherein the plurality of disaggregated energy consumption values are used to aid the select user or an entity in monitoring and managing energy consumption within the select user's residence.

19. A non-transitory computer-readable storage medium including instructions that, when executed by at least one processor of a computing system, cause the computing system to predict energy consumption of a select user by:
  acquiring a set of data from a plurality of data sources, wherein the set of data comprises (1) energy consumption data associated with a plurality of other users and (2) external features including geophysical and building characteristics, wherein the set of data is dynamic and changes over time as the energy consumption data and the external features change or are being updated, and wherein the plurality of data sources comprise residential energy consumption surveys associated with the plurality of other users;
  training a Bayesian network model based on the set of data, wherein the Bayesian network model corresponds to a probabilistic graphical model, and wherein the Bayesian network model is updated as the set of data changes over time;
  receiving information associated with the select user at a frequency for a plurality of time intervals with each interval being greater than or equal to one day, wherein the information comprises a total actual energy consumption value in said select user's residence for each interval, wherein the information associated with the select user includes one or more inputs from the select user;
  inputting at least a portion of the information into the Bayesian network model as the information is being received, wherein the Bayesian network model is updated as the information associated with the select user changes over time; and
  predicting, using the Bayesian network model, a plurality of disaggregated energy consumption values for each of a plurality of different energy consumption sources that contribute to the total energy consumption value in the select user's residence, wherein the plurality of disaggregated energy consumption values are predicted from the information comprising the total actual energy consumption value, wherein the plurality of disaggregated energy consumption values are used to aid the select user or an entity in monitoring and managing energy consumption within the select user's residence.

* * * * *